United States Patent [19]

Carlstedt

[11] 4,111,290

[45] Sep. 5, 1978

[54] THRUST BEARING WITH SPRING CLIP MOUNTING

[75] Inventor: Richard A. Carlstedt, Chicago, Ill.

[73] Assignee: Aetna Bearing Company, Chicago, Ill.

[21] Appl. No.: 787,566

[22] Filed: Apr. 14, 1977

[51] Int. Cl.$^2$ ............................................. F16D 23/00
[52] U.S. Cl. ..................................................... 192/98
[58] Field of Search ............... 192/98, 110 B; 308/233

[56] References Cited

U.S. PATENT DOCUMENTS

| 2,810,464 | 10/1957 | Geibel | 192/98 X |
| 3,909,086 | 9/1975 | Keleshian | 308/233 |
| 3,913,714 | 10/1975 | Camp | 192/98 X |

*Primary Examiner*—Edgar W. Geoghegan
*Attorney, Agent, or Firm*—Olson, Trexler, Wolters, Bushnell & Wolters, Ltd.

[57] ABSTRACT

There is disclosed a thrust bearing assembly for use as a clutch throw-out bearing which assembly includes novel spring clip means for maintaining attachment of the bearing assembly with the clutch release arms or forks. The bearing assembly includes a bearing arrangement or unit and a carrier member having a pair of generally co-planar, radially directed flanges which extend transversely of the axis of the bearing arrangement. A pair of spring clips is provided for attaching the bearing assembly to the two arms of a clutch release fork, one of the spring clips being attached to each of the flanges of the carrier member. Each spring clip comprises an eye portion for pivotal attachment of the clip by a rivet or other suitable holding member to one of the flanges; a loop portion joined to the eye portion for providing spring tension; and a transverse portion for overlying the fork arms to maintain attachment. The transverse portion may include a reverse bent nose portion to facilitate and maintain assembled engagement. Each spring clip is mounted upon its flange for pivotal movement in a direction generally perpendicular to the axis of the bearing, whereby the spring clip may be pivoted into engagement with the adjacent clutch release fork arm, the nose portion sliding over the groove or notch in one face of the fork arm and snapping thereover to engage the arm.

17 Claims, 8 Drawing Figures

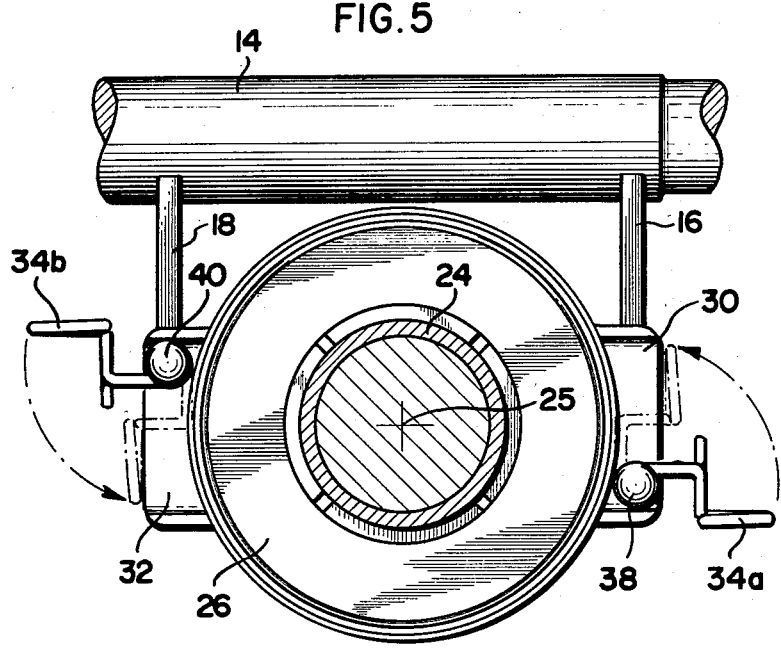
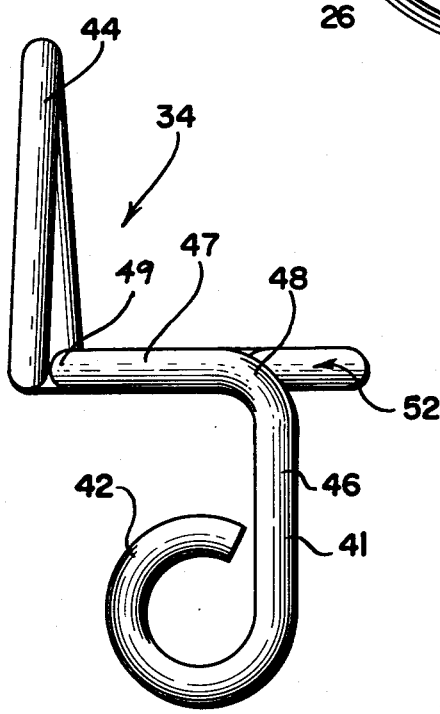
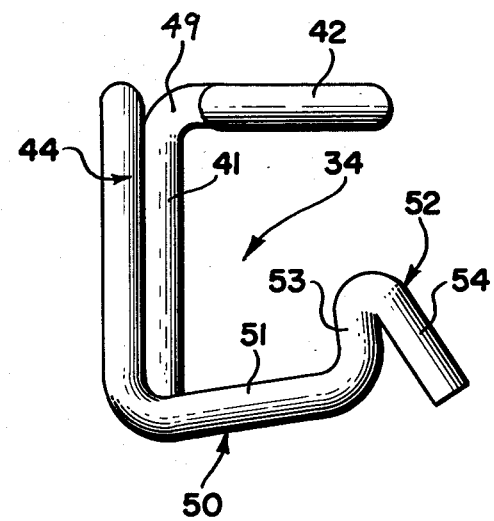
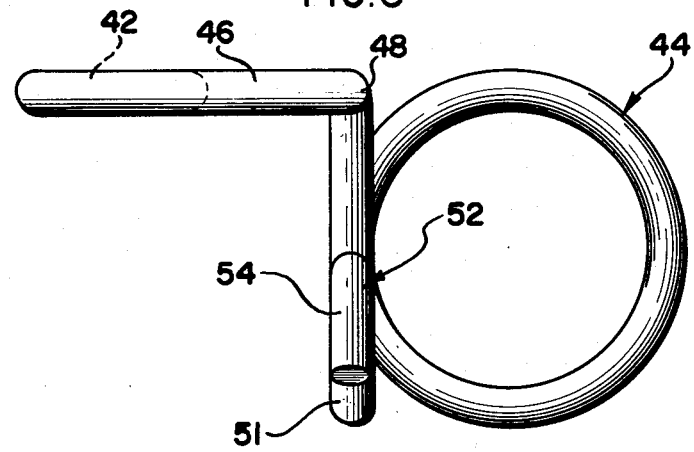

THRUST BEARING WITH SPRING CLIP MOUNTING

BACKGROUND OF THE INVENTION

This invention relates generally to thrust bearings used as clutch throw-out or release bearings in automobiles, and more particularly to a new and improved attachment arrangement which utilizes a pair of spring clips for engaging the clutch release fork and maintaining attachment of the bearing structure thereto.

Automotive clutch throw-out bearings are well known in the art and their function is to provide a force transmitting member between the foot-operated clutch pedal and a plurality of rotating clutch release arms associated with the pressure plate on an automotive clutch. These clutch throw-out bearings are slidably mounted on a shaft or quill and are engaged by a clutch release fork normally carried on a shaft which is rotated by the foot-operated clutch pedal. When the pedal is depressed, the fork will pivot and move the bearing assembly into engagement with the clutch release arms to disengage the clutch.

In certain automobile designs, and especially Volkswagens, the foregoing parts are mounted within a bell housing, which also includes a transmission quill, upon which the bearing assembly is slidably mounted. In replacement of the throw-out or clutch release bearing, it must first be engaged over said quill. Thus relative movement between the bearing and the fork arms, as is required to effect engagement of prior art types of clip connection arrangements, is severely limited by the interior dimension of the bell housing therearound. That is to say, there is little space to accommodate manipulation of the attachment members, such as clips or the like, as required to complete installation or replacement of the release bearing assembly.

Generally, each bearing assembly includes a housing or carrier member, which has a pair of substantially co-planar flanges, extending transversely of the central axis of the bearing and formed symmetrically about a common diameter thereof. In certain prior art devices a holding clip is attached by a retaining fastener to each of the flanges for attachment of the bearing assembly to the clutch release fork. These clips are either of the removable type or are movable or flexible only in a plane parallel to the bearing axis.

The separable clips and clip-retaining fasteners are undesirable as they may become detached and lost when the assembly is being shipped, distributed or stored prior to being used. The flexible or movable prior art designs have generally comprised a U-shaped or half-loop clip, attached to the carrier flanges so as to permit only a limited degree of movement therebetween, requiring that the clip arms be forced part and outwardly of the carrier in order to be mounted or snapped over the arms of the clutch release fork. This method of installation presents a problem in that there is often insufficient space available to manipulate the clips and also there is a danger that the clips may become permantly deformed from such manipulation and thus fail securely to grip the arms of the clutch release fork. Also, the U-shaped or half-loop design of prior art clips does not provide sufficient positive tension or biasing force against the fork, so that some play will exist and the mounting of the bearing assembly thereto may be less secure than desirable.

Accordingly, it is a general object of this invention to provide a new and improved bearing assembly for use as a clutch throw-out bearing, which includes a pair of spring clips specially adapted to hold the bearing assembly to the clutch release fork, and to facilitate after market installation.

A more specific object of this invention is to provide a thrust bearing assembly including spring clips which are adapted to be easily and readily attached to the clutch release fork in spite of the limited space available for manipulation thereof.

Another object of this invention is to provide a thrust bearing assembly including spring clips, in accordance with the foregoing objects, wherein the spring clips are simply and inexpensively attached to the carrier plate of the bearing assembly, as to be eliminate any loose or removable parts of the bearing assembly which may become separated and lost during handling thereof.

Yet another object of this invention is to provide a bearing assembly including spring clips, in accordance with the foregoing objects, wherein the spring clips are relatively simple and economical to manufacture and attach to the bearing assembly.

Briefly, a clutch throw-out bearing assembly according to the present invention comprises a thrust bearing unit including a carrier member or housing having a pair of substantially co-planar radially extending flanges, the flanges extending symmetrically about a common diameter of the bearing and transversely of the axis through the bearing unit. The thrust bearing assembly further includes means for attaching the assembly to a clutch release fork comprising a pair of spring clips, one being pivotally attached to each of the flanges of the carrier for pivotal movement substantially perpendicular to the axis through the bearing. Each of the spring clips includes; an eye or connector portion for attachment to the carrier flange; a transverse portion for engaging the clutch release fork, which may include a nose portion for facilitating flexing of the transverse portion into engagement with the fork and for engaging the fork to prevent inadverent disconnection; and a loop or spring tensioning portion joining the transverse portion and eye portion, which serves to urge the transverse portion into engagement with the release fork.

Other objects, features and advantages of the invention will be more fully realized and understood from the following detailed description together with the accompanying drawings wherein like reference numerals are used throughout to designate like elements and components.

BRIEF DESCRIPTION OF THE DRAWINGS

FIG. 5 is a rear elevational view, similar to FIG. 3, illustrating an alternate embodiment of the spring clip arrangement of the present invention;

FIG. 6 is an enlarged elevational view of a spring clip, constructed in accordance with the present invention;

FIG. 7 is a bottom view of the clip of FIG. 6; and
FIG. 8 is a side view of said clip, rotated 90° from FIG. 6.

DETAILED DESCRIPTION OF THE ILLUSTRATED EMBODIMENT

Figure 1:
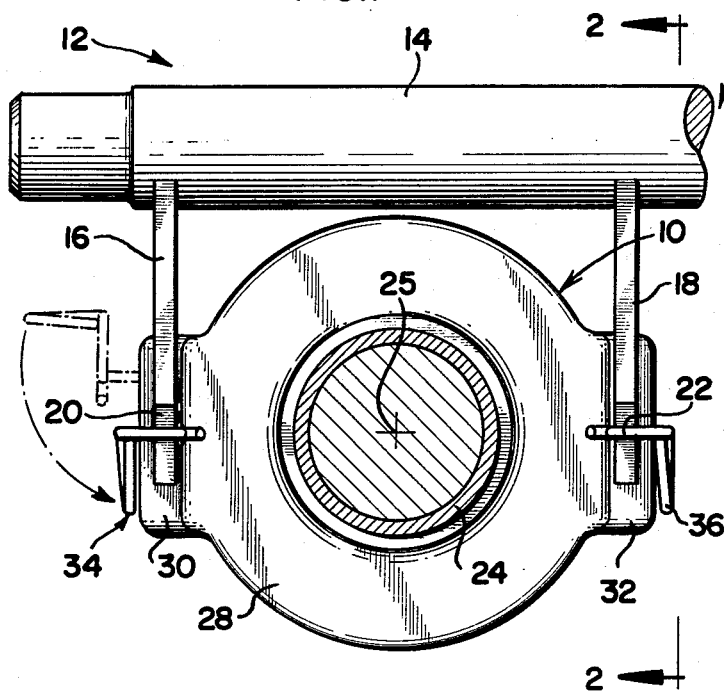
FIG. 1 is a front elevational view of a clutch throw-out bearing assembly including a pair of spring clips, constructed in accordance with the present invention, and attached to a clutch release fork.

Referring now to the drawings and FIGS. 1–4, a clutch throw-out bearing assembly 10, constructed in accordance with the principles of the present invention is shown attached to a clutch release fork assembly 12 for movement thereby into engagement with a plurality of rotating clutch release arms 13. This then disengages the clutch to disconnect the engine from the transmission and differential.

Figure 2:
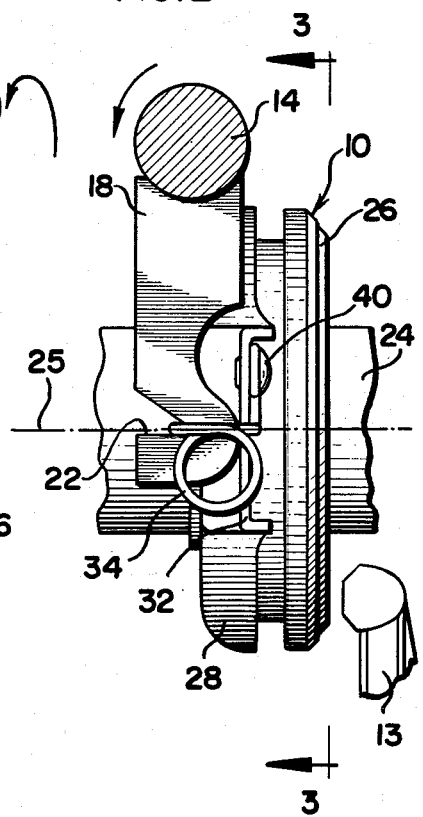
FIG. 2 is a side elevational view, taken generally along the line 2—2 of FIG. 1, in the direction indicated.
Figure 3:
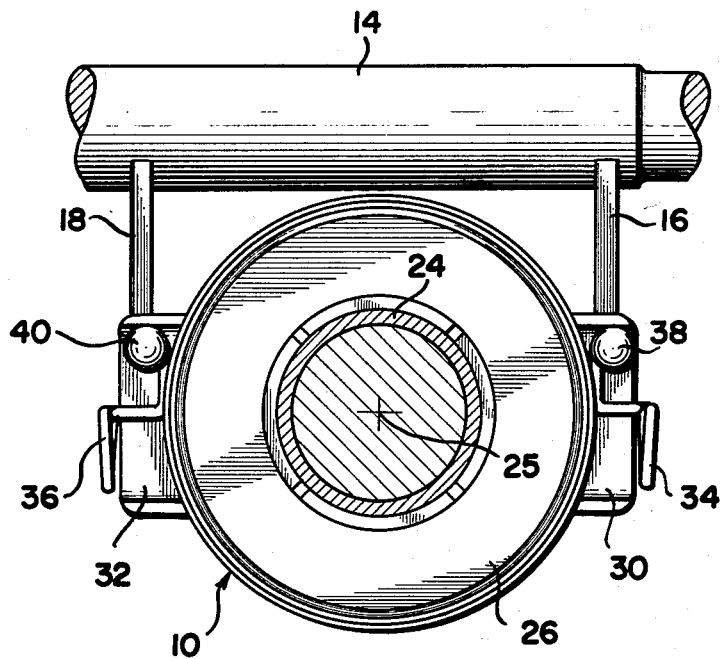
FIG. 3 is a rear elevational view, taken generally along the line 3—3 of FIG. 2.
Figure 4:
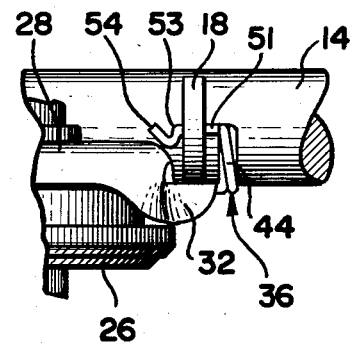
FIG. 4 is a partial bottom view of a portion of FIG. 1 illustrating how the clip engages over the fork arm.

The clutch release fork assembly 12 includes a shaft 14 which, in accordance with the well known practice, is rotated by a foot-operated clutch pedal (not shown), said shaft 14 further including a pair of spaced apart arms 16, 18 mounted thereon for movement in response to rotation of the shaft 14. Each of the arms 16, 18 is generally rectangular in cross-section and includes a notch or groove 20, 22 formed in one side face thereof. It will be understood that in a typical transmission assembly a generally cylindrical transmission quill 24 extending between the arms 16, 18 and has the bearing assembly 10 slidably mounted thereon. The clutch release arms 16 and 18 engage the bearing assembly 10, as can be seen in FIG. 2. Accordingly, when the clutch pedal (not shown) is depressed, the shaft 14 will be rotated in the direction indicated. The rotation will result in movement of the arms 16 and 18 to the right as viewed in FIG. 2, bringing the bearing assembly 10 into contact with the rotating clutch release arms 13.

The specific details of the bearing assembly 10 are not critical to the present invention, and preferably said bearing assembly is constructed substantially in accordance with the thrust bearing disclosed in U.S. Pat. No. 3,909,086, assigned to the assignee of the present invention. Basically, the assembly 10 includes an axially facing bearing member 26 which engages the clutch release fingers 13, and is rotatable with respect to the remainder of said assembly 10. A bearing carrier member or housing 28 forms part of the remainder of assembly 10. The bearing carrier 28 as illustrated includes a pair of generally co-planar, radially directed flanges 30 and 32, which extend transversely of the axis 25 through the bearing assembly 10 and are formed generally symmetrically about a common diameter of assembly 10.

A pair of spring clips 34, 36 are pivotly attached to the respective flanges 30 and 32 of carrier or housing 28, by a pair of fastener members such as rivets 38 and 40 which extend through suitable eyelets, in the spring clips 34 and 36 and are affixed to flanges 30 and 32, respectively. Thus, the spring clips 34, 36 are capable of pivotal movement substantially perpendicular to the axis 25, between the positions as shown in FIGS. 1–4 in full line, and the position shown in phantom in FIG. 1.

In the fully assembled condition of FIGS. 1–4, the spring clips 34 and 36 are engaged in the notches 20 and 22 in the clutch fork arms 16 and 18. Thus the bearing assembly 10 is in effect joined or attached to said arms for corresponding movement upon depression of the clutch pedal.

Before discussing in detail how the present invention facilitates assembly of a replacement bearing assembly 10, or for that matter removal of a serviceable bearing assembly 10 for subsequent re-assembly, the construction of the spring clips 34 and 36 will be considered.

Referring now to FIGS. 6, 7 and 8, a spring clip 34 constructed in accordance with the principles of the present invention is shown in additional detail. The spring clip 34 preferably is formed from a single, elongate segment of wire or other spring-like metallic material, designated generally 41. Since both clips 34 and 36 are of similar design, with the clip 36 being constructed as the mirror image of clip 34, only the specific construction of clip 34 will be detailed, it being understood that clip 36 includes similar structural features to those described with regard to clip 34.

The spring clip 34 includes a generally circular eyelet portion 42 formed on one end of the segment 41, to accommodate fastener means, such as the rivets 38, 40 of FIGS. 1–4. The eyelet portion 42 provides for the pivotly mounting of the spring clip 34 upon a respective flange 30, 32 of the carrier 28. A loop or spring tensioning portion 44, is formed in an intermediate portion of segment 41 in a plane substantially perpendicular to the plane of the eyelet portion 42. The loop or spring tensioning portion 44 is generally circular in cross-section and comprises substantially a spring-coil. Relatively short connecting portions 46 and 47 join the eyelet portion 42 with the loop or spring portion 44, which connecting portions 46 and 47 are linked by a right angle bend 48. To accomplish the aforementioned alignment of the loop or spring portion 44 in a plane substantially perpendicular to the plane of the eyelet member 42, a second right angle bend 49 is employed.

A transverse portion 50, best seen in FIG. 7, extends from an end of the loop or spring portion 44 opposite the end thereof connected to the eyelet portion 42. Transverse portion 50 is disposed substantially perpendicular to the loop portion 44, and is spaced from eyelet 42. Preferably, said transverse portion 50 includes a linear segment 51 and a nose portion 52 which extends from the end of said transverse portion 50 opposite to that connected to the loop or spring portion 44. The nose portion 52 is provided by a reverse bend formed in an end of the wire segment 41. Initially a substantially right angle bend is formed in the said wire segment 41 proximate the linear segment 51 to provide a first section 53, which is termed an abutment section for a purpose to become clear hereinafter. A second bend is formed to provide an end segment 54 which is disposed at a less severe angle with respect to the linear portion 51 than is segment 53. The segment 54, for a purpose to be explained is termed the camming section.

Discussion now will be had with regard to the operational features of the present invention which facilitate mounting of the bearing assembly 10. In this regard, it should be noted that the spring clips, 34 and 36, described above, are mounted upon each of the flanges 30 and 32 of the bearing assembly 10, in a manner which permits pivotal movement away from the axis 25, as shown in FIG. 1. The clutch throw-out bearing assembly 10 may then be engaged over the transmission quill 24 and the assembly 10 moved along the quill 24 until the flanges 30 and 32, are proximate the respective clutch fork arms 16 and 18. The spring clips 34 and 36 are pivoted outwardly of the respective flanges 30 and 32, generally to the position shown in phantom in FIG. 1, or, alternatively the positions shown for the spring clips 34a and 34b in FIG. 5, to be discussed hereinafter. With the clips pivoted out of the general area of engagement of flanges 30 and 32 with the arms 16 and 18, the said arms may be brought to contact with said flanges without interference. The spring clips 34 and 36 may then be pivoted inwardly toward the axis 25 to the position shown in full line FIG. 1 for engaging the transverse portion 50 of spring clips 34 and 36 in the grooves 20 and 22 formed in arms 16 and 18.

As the spring clips 34 and 36 are moved inwardly toward axis 25, the nose portions 52 will initially engage the arms 16 and 18. Due to the presence of the camming portions 54, and the tapered surfaces presented thereby, continued force tending to move the clips inwardly, will cause the transverse portion 50 to flex and be engaged over the respective arms 16 and 18 with a snap fit. Once so engaged, the abutment segments 53 will be positioned to prevent inadvertent movement of the clips, as can be seen from FIG. 4, thereby locking the clips in the assembled condition.

Preferably, the distance between the linear segment 51 and the eyelet 42 is slightly less than the combined thickness of the associated flange 30 or 32 and the arm 16 or 18. Accordingly, as the spring clip 34 or 36 is engaged with an associated arm 16 or 18, the transverse portion 50 of the clip will be flexed, against the spring tension provided by the loop portion 44. Thus when the linear segment 51 is engaged in the notch 20 or 22, said loop portion 44 provides a spring force urging or biasing the arm 16 or 18 into engagement with the associated flange 30 or 32 of assembly 10.

Thus, it will be appreciated that with the present invention, only a minimum amount of space for manipulation of the spring clips 34 and 36 is required to effect assembly. Further, since said clips are pivoted out of the path of movement of the fork arms 16 and 18, engagement may be effected without the danger of over-stressing or permanently deforming the clips.

It will be noted that the spring clips 34 and 36 of FIGS. 1–4 are constructed substantially as mirror images of each other, whereby the pivotal movement required to bring them into engagement with the clutch release fork arms 16 and 18 must take place in opposite directions about a common circumference of the bearing assembly 10. In an alternate embodiment, shown in FIG. 5, spring clips 34a and 34b are not mirror image parts, but are substantially identical. The clips 34a and 34b are mounted at generally diagonally opposed corners of the flanges 30 and 32 of the bearing carrier 28 for pivotal movement into engagement with clutch release fork arms 16 and 18 in substantially the same direction about a common circumference of the bearing assembly 10. Thus, with this alternate embodiment, a further advantage is obtained in that but a single clip need be provided.

There has been described an improved clutch throwout bearing assembly which facilitates assembly where space and relative movement are limited. While the invention has been described with regard to replacement, the invention is significant should it become necessary to remove a serviceable bearing assembly 10. With the prior art designs using spring clips, these often were destroyed or irreparably damaged upon removal. This need not occur with the present invention, as the pivotal spring clips also permit removal and reinstallation.

While specific embodiments of the invention have been disclosed herein, it will be understood that variations and modifications may be affected without departing from the spirit and scope of the invention as defined in the claims appended hereto.

The invention is claimed as follows:

1. A clutch release bearing assembly comprising in combination: a thrust bearing unit, a bearing unit carrier member having flange means extending transversely of the axis of said bearing unit, and means for attaching said thrust bearing assembly to a clutch release fork, said means comprising at least one spring clip pivotally attached to one of said flanges of said carrier member for pivotal movement substantially perpendicular to the axis through said bearing unit, said spring clip comprising, a connector portion for attaching said clip to said carrier, a traverse portion for engaging said clutch release fork, and a tensioning portion formed intermediate said connector portion and said transverse portion, such that said clip may be pivoted away from said bearing unit axis to permit said clutch release fork to be moved into position in overlying engagement with said bearing assembly, and said clip then pivoted toward said axis to engage said transverse portion over said clutch release fork with said clip and the force provided by said tensioning portion effecting interconnection of said bearing assembly and said clutch release fork.

2. A bearing assembly as defined in claim 1, wherein said transverse portion includes a nose portion on the free end thereof and having a reverse bent section which provides camming means which will engage said clutch release fork to flex said transverse portion to permit engagement over said fork, with said nose portion after assembly preventing inadvertent pivotal movement of said spring clip in a direction away from said bearing unit axis.

3. A bearing assembly according to claim 1 wherein said connector portion includes an eyelet section with fastener means disposed in said eyelet section and engaged with said carrier member to effect a pivotal mounting of said spring clip on said flange means.

4. A bearing assembly according to claim 1, wherein a pair of diametrically opposed spring clips are provided for attachment of said assembly to said clutch release fork.

5. A bearing assembly according to claim 4, wherein said pair of spring clips are substantially identical, and are attached to said flanges of said carrier for pivotal movement into engagement with said clutch release fork in substantially the same direction about a common circumference of said bearing.

6. A bearing assembly according to claim 4, wherein said spring clips comprise a right-hand and a left-hand spring clip being substantially mirror images of each other, and mounted on said flange means for pivotal movement into engagement with said clutch release fork in opposite directions about a common circumference of said bearing.

7. A bearing assembly according to claim 1, wherein said spring clip is formed from a single elongate segment of metallic material.

8. A bearing assembly according to claim 1, wherein said spring clip is formed from a single elongate segment of metallic material, with one end section thereof being formed into a loop to provide an eyelet which defines said connector portion, an intermediate section of said segment being bent at substantially a right angle to said connector portion, and being formed into a second loop to define said tensioning portion, and the other end section of said segment being bent at substantially a right angle to said tensioning portion and extending therefrom in the same direction as said connector portion, said other end section being spaced from said connector portion and defining said transverse portion for engagement with said clutch release fork.

9. A bearing assembly according to claim 8, wherein said other end section includes a substantially straight segment and a reverse bent segment, said straight segment overlying said clutch release fork, and said reverse bent segment providing a nose portion on the end of said transverse portion which facilitates engagement of said spring clip with said fork and maintains said engagement by preventing inadvertent pivotal movement of said clip.

10. Spring clip means for use with a clutch release bearing assembly, wherein said assembly includes a bearing unit carrier member, with said spring clip means for attaching said assembly to clutch release fork arms, said spring clip means comprising a connector portion for mounting said clip to said carrier member for pivotal movement toward and away from the axis of the bearing unit in a plane substantially perpendicular to said axis, a tensioning segment disposed transversely of said connector portion and positioned on a side thereof away from said carrier member, and a transverse portion extending from said tensioning portion in direction toward said carrier member and being spaced from said connector portion, such that when said clip is affixed to a carrier member it may be pivoted away from said carrier member to permit said clutch release fork arms to be engaged against said member, and said clip pivoted to engage said transverse portion over said arms to maintain said engagement.

11. A spring clip according to claim 10, wherein said transverse portion includes a substantially linear segment, and a reverse bent segment providing a nose portion having a camming surface for facilitating engagement of said spring clip over said arms, and an abutment surface for preventing inadvertent movement of said clip after assembly.

12. A spring clip according to claim 10, wherein said spring clip is formed from a single section of wire, and said connector portion and said tensioning portion are provided by loops formed in said wire section.

13. A spring clip according to claim 10, wherein said clip is formed from a single elongate segment of metallic material, with one end section thereof being formed into a loop to provide an eyelet which defines said connector portion, an intermediate section of said segment being bent at substantially a right angle to said connector portion, and being formed into a second loop to define said tensioning portion, and the other end section of said segment being bent at substantially a right angle to said tensioning portion and extending therefrom in the same direction as said connector portion, said other end section being spaced from said connector portion and defining said transverse portion for engagement with said clutch release fork.

14. A spring clip according to claim 13 wherein said other end section includes a substantially straight segment and a reverse bent segment, said straight segment overlying said clutch release fork, and said reverse bent segment providing a nose portion on the end of said transverse portion which facilitates engagement of said spring clip with said fork and maintains said engagement by preventing inadvertent pivotal movement of said clip.

15. In a clutch release bearing assembly of the type adapted for slidable mounting on a quill and including a bearing housing member having clip means for maintaining said housing in engagement with the arms of a clutch release fork assembly, such that movement of said fork assembly will produce corresponding movement of said bearing assembly to actuate the clutch release fingers of a clutch assembly, the improvement wherein said clip means include means pivotally mounting said clips to said housing member for movement in a plane perpendicular to the axis of said bearing assembly, whereby said clips may be moved away from said axis to permit said arms to be brought into engagement with said housing, and then moved toward said axis to overlie said arms and maintain said engagement.

16. A bearing assembly according to claim 15, wherein said clip means includes a mounting portion for engagement with said housing, a spring portion disposed transversely of said mounting portion and outwardly of said housing, and a transverse portion extending transversely from said spring portion in the same direction as said mounting portion and in spaced relation to said mounting portion.

17. A bearing assembly according to claim 6, wherein said transverse portion includes a reverse bent segment, providing a camming portion to facilitate engagement with said arm, and an abutment portion to maintain said engagement.

* * * * *

UNITED STATES PATENT AND TRADEMARK OFFICE
CERTIFICATE OF CORRECTION

PATENT NO. : 4,111,290
DATED : September 5, 1978
INVENTOR(S) : RICHARD A. CARLSTEDT It is certified that error appears in the above-identified patent and that said Letters Patent are hereby corrected as shown below:

Col. 1, line 56, change "part" to --apart--;
Col. 2, line 16, change "as to be" to --so as to--;
Col. 6, line 11, change "traverse" to --transverse--;
Col. 8, line 42, change "claim 6" to --claim 16--.

Signed and Sealed this

Twenty-second Day of May 1979

[SEAL]

Attest:

RUTH C. MASON
Attesting Officer

DONALD W. BANNER
Commissioner of Patents and Trademarks